Patented Apr. 5, 1949

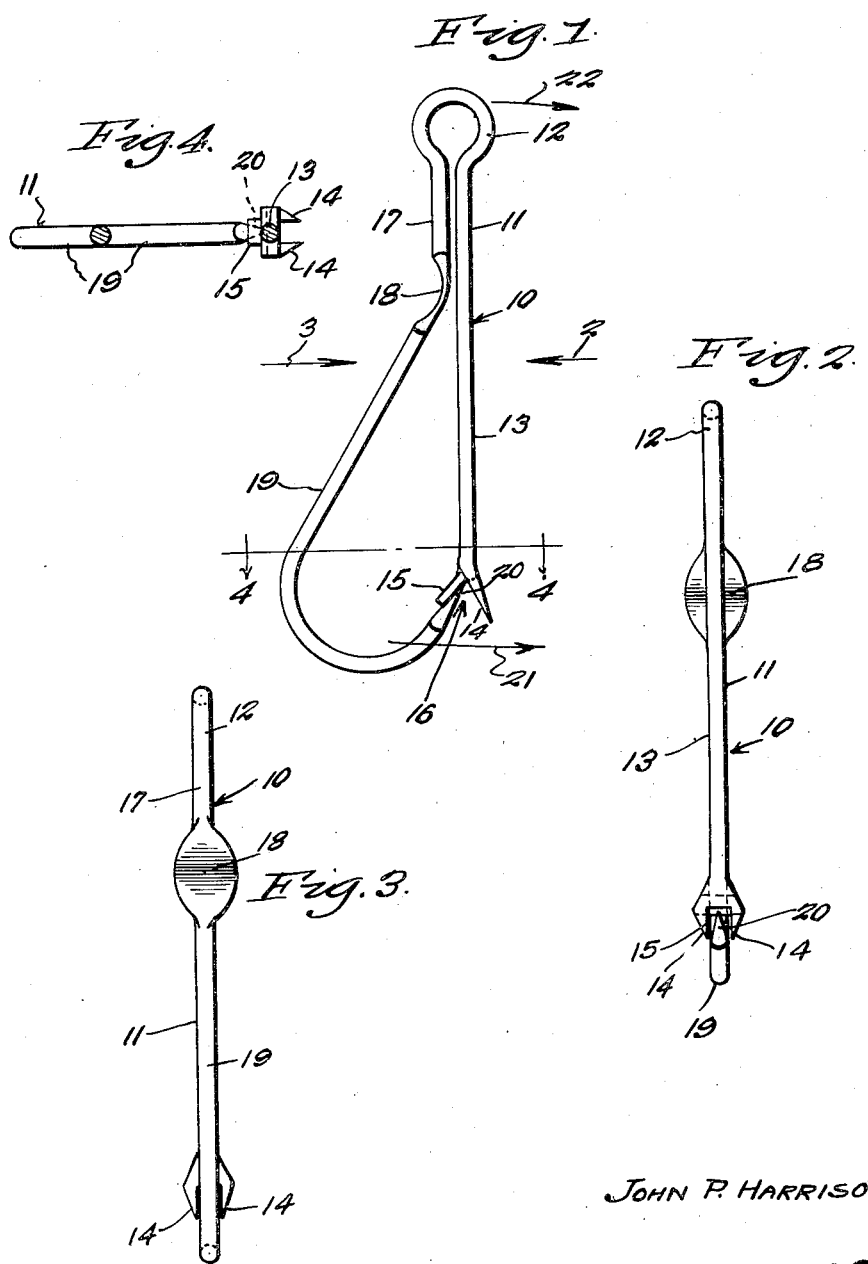

2,466,101

UNITED STATES PATENT OFFICE 2,466,101

FISHING DEVICE

John P. Harrison, Versailles, Ind.

Application June 1, 1946, Serial No. 673,843

1 Claim. (Cl. 43—38)

This invention relates to new and useful improvements and structural refinements in fishing devices, and the principal object of the invention is to provide a device of the character herein described, which may be effectively and conveniently employed in place of the conventional fishing hook, in order to prevent the possibility of the fishing gear becoming entangled with weeds, or other obstructions.

A further object of the invention is to provide a fishing device which will securely hold the fish thereon, and thus prevent the escape of the same.

Another object of the invention is to provide a fishing device which may be easily and quickly removed from the mouth of a fish, after the latter has been caught thereon.

An additional object of the invention is to provide a fishing device which is simple in construction, effective and dependable in operation, and which cannot easily become damaged.

A still further object of the invention is to provide a fishing device which will readily lend itself to economical manufacture.

With the above more important objects in view, and such other objects as may become apparent as this specification proceeds, the invention consists essentially of the arrangement and construction of parts as illustrated in the accompanying drawings, in which:

Figure 1 is a side elevation of the invention;

Figure 2 is a further elevation, taken in the direction of the arrow 2 in Figure 1;

Figure 3 is a still further elevation, taken in the direction of the arrow 3 in Figure 1, and Figure 4 is a cross sectional view, taken in the plane of the line 4—4 in Figure 1.

Like characters of reference are used to designate like parts in the specification and throughout the several views.

Referring now to the accompanying drawings in detail, the invention embodies in its construction a fishing device designated generally by the reference character 10, the same being formed from a one piece, wire-like rod 11, which is doubled upon itself intermittently of its length and is arcuated in the doubled portion thereof, to form an eye 12.

One end portion of the rod 11 constitutes a substantially straight shank 13, the free extremity of this shank being flattened and bifurcated to provide a pair of pointed prongs 14. It will be noted that the prongs 14 are angulated to one side of the shank 13, and the shank portion between the prongs is angulated to the relatively opposite side, to constitute a pad 15. The pad 15 together with the prongs 14 forms a V-shaped seat 16, as is best shown in the accompanying Figure 1.

The remaining end portion 17 of the rod 11 is flattened at a point adjacent the eye 12 to provide a section of lesser resistance to bending, this being designated by the reference character 18. The end portion 17 extends beyond the section 18 and is arcuated to form a hook 19, this in turn, terminating in a pointed extremity 20.

When the invention is placed in use, the fishing line (not shown) is secured in the eye 20 and suitable bait is positioned on the hook 19. Normally, the extremity 20 will be disposed in the seat 16 and will rest against the pad 15, as is shown in the accompanying drawings.

As the fish attempts to swallow the bait, the shank 13 and the hook 19 will be compressed together, during which action the hook 19 will bend about the section 18 in the direction of the arrow 21 and the pointed extremity 20 thereof will be forced outwardly through the spacing between the prongs 14.

The bending action of the hook 19 will be assisted by the pull on the fishing line and also, by the pull of the fish upon the fishing device as a whole, and the pointed extremity 20 will thus be caused to engage the lip of the fish, thereby catching the same. Simultaneously, the prongs 14 will penetrate into the lip to an extent permitted by the pad 15.

The device may be released from the mouth of the fish by simply pressing the eye 12 and the associated shank 13 in the direction of the arrow 22 and withdrawing the prongs 14 and the extremity 20 from the mouth.

It should be noted that when the device is in its closed position as shown in the accompanying Figure 1, live bait will be effectively retained on the hook 19 by the relative positioning of the point 20 with respect to the pad 15 and the prongs 14, thereby preventing the escape of the bait.

It is believed that the advantages and use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

In a fishing device including a hook terminating in a pointed extremity and a shank movably connected to said hook, a head provided on said shank, said head being an intermediate portion and a pair of side portions in angular relation to each other and in relatively opposite directions from said shank and providing a flat pad and a pair of spaced pointed prongs respectively, the pointed extremity of said hook being receivable between said prongs and engageable with said pad.

JOHN P. HARRISON.

REFERENCES CITED

The following references are of record in the file of this patent:

UNITED STATES PATENTS

| Number | Name | Date |
| --- | --- | --- |
| 2,176,820 | McConnell | Oct. 17, 1939 |
| 2,241,320 | Sarff | May 6, 1941 |